United States Patent
Yu

(10) Patent No.: US 8,022,960 B2
(45) Date of Patent: Sep. 20, 2011

(54) DYNAMIC CONFIGURABLE TEXTURE CACHE FOR MULTI-TEXTURING

(75) Inventor: Chun Yu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 916 days.

(21) Appl. No.: 11/677,986

(22) Filed: Feb. 22, 2007

(65) Prior Publication Data

US 2008/0204466 A1    Aug. 28, 2008

(51) Int. Cl.
G06T 11/40    (2006.01)
G09G 5/36    (2006.01)

(52) U.S. Cl. ........................................ 345/552; 345/557
(58) Field of Classification Search .................. None
See application file for complete search history.

(56) References Cited

U.S. PATENT DOCUMENTS

| | | | | |
|---|---|---|---|---|
| 5,367,653 A | * | 11/1994 | Coyle et al. .................... | 711/128 |
| 2004/0189652 A1 | * | 9/2004 | Emberling .................... | 345/557 |
| 2005/0080994 A1 | * | 4/2005 | Cohen et al. .................... | 711/118 |
| 2008/0028152 A1 | * | 1/2008 | Du et al. ........................ | 711/129 |

FOREIGN PATENT DOCUMENTS

| | | |
|---|---|---|
| EP | 0747860 | 12/1996 |
| WO | 9910613 | 3/1999 |
| WO | 0120461 | 3/2001 |

OTHER PUBLICATIONS

The PC Guide; Cache Mapping and Associativity; http://www.pcguide.com/ref/mbsys/cache/funcMapping-c.html; dated Apr. 17, 2001.*
International Search Report—PCT/US08/054452—International Search Authority, European Patent Office—Sep. 10, 2008.
Written Opinion—PCT/US08/054452—International Search Authority, European Patent Office—Sep. 10, 2008.
Cox M., et al., "Muiti-level texture caching for 3D graphics hardware," Computer Architecture, 1998, Proceedings, The 25th Annual International Symposium on Barcelona, Spain Jun. 27-Jul. 1, 1998, Los Alamitos, CA, IEEE Comput. Soc, Jun. 27, 1998, pp. 86-97.
Hakura Z.S., et al., "The Design and Analysis of a Cache Architecture for Texture Mapping," 24th Annual International Symposium on Computer Architecture. Denver, Jun. 2-4, 1997, Conf. 24, Jun. 2, 1997, pp. 108-120.

* cited by examiner

Primary Examiner — Kee M Tung
Assistant Examiner — Carlos Perromat
(74) Attorney, Agent, or Firm — Timothy F. Loomis; James R. Gambale, Jr.

(57) ABSTRACT

Techniques for dynamically configuring a texture cache are disclosed. During a texture mapping process of a three-dimensional (3D) graphics pipeline, if the batch is for single texture mapping, the texture cache is configured as a n-way set-associative texture cache. However, if the batch is for multi-texture mapping the n-way set-associated texture cache is divided into at n/M-way set-associative sub-caches where n and M are integers greater than 1 and n is divisible by M.

24 Claims, 10 Drawing Sheets

DYNAMIC CONFIGURABLE TEXTURE CACHE FOR MULTI-TEXTURING

BACKGROUND

1. Field

The present disclosure relates generally to graphics, and more specifically to techniques for dynamically configuring a texture cache.

2. Background

Texture mapping is one of the most successful and popular techniques in a 3D graphics pipeline for adding realism to a computer-generated scene. A typical texture mapping (TM) process is highly memory access intensive because the characteristic of the TM process involves multiple texture lookups. The frequent texture lookups cause a bottleneck on the memory bus. To alleviate this problem, a texture cache is often used. The texture cache serves to eliminate redundancy of fetching texels from an external memory source (e.g. off-chip memory) and utilizes the natural spatial locality of a triangle's rasterization.

Graphics applications typically send drawing commands in a batch mode. In the batch mode all the pixels share the same context state registers in a batch. In a single texture batch, all pixels fetch texels from one single texture map. However, in a multi-texture batch mode, if the different textures are stored inside one cache, conflict misses are very likely to occur. When two texture maps are assigned or allocated to the same cache line, the texture maps will thrash each other and generate redundant Memory traffic.

In view of the foregoing, using one cache for different texture maps reduces power and pixel performance.

There is therefore a need in the art for techniques to dynamically configure a texture cache.

SUMMARY

Techniques to dynamically configure a texture cache are described herein. In an embodiment, a wireless device comprising a graphics processing unit having a dynamically configurable cache is provided. The dynamically configurable cache has a first configuration corresponding to a n-way set-associative texture cache, when a single texture mapping mode is enabled and a second configuration corresponding to a set of n/M-way set-associative sub-caches, when a multi-texture mapping mode is enabled where n and M are integers greater than 1 and n is divisible by M. The device also includes a memory coupled to the graphics processing unit.

In another aspect, a graphics processing unit includes a driver operable to determine whether single texture mapping is enabled or multi-texture mapping is enabled for a selected application. The unit also includes a dynamically configurable cache having a first configuration corresponding to a n-way set-associative texture cache, when the single texture mapping is enabled and a second configuration corresponding to a set of n/M-way set-associative sub-caches, when the multi-texture mapping is enabled, where n and M are integers greater than 1 and n is divisible by M.

In yet another aspect, a computer program product including a machine-readable medium has instructions for causing a machine to determine whether a selected application has single texture mapping enabled or multi-texture mapping enabled. The instructions cause the machine to configure a n-way set-associative texture cache, when the single texture mapping is enabled. The instructions also cause the machine to divide the n-way set-associated texture cache into a set of M n/M-way set-associative sub-caches, when the multi-texture mapping is enabled, where n and M are integers greater than 1, n is divisible by M and M corresponds to a number of texture maps.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify corresponding throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Many game applications require three-dimensional (3D) graphics applications which display 3D objects in a two-dimensional (2D) space (e.g., a display screen). The pixels in a 2D graphic have the properties of position, color, and brightness, while a 3D pixel adds a depth property that indicates where the point lies on an imaginary Z-axis. Texture is created as 3D pixels are combined, each with its own depth value.

The techniques described herein may be used for wireless communication, computing, networking, personal electronics, etc. An exemplary use of the techniques for wireless communication is described below.

Figure 1:
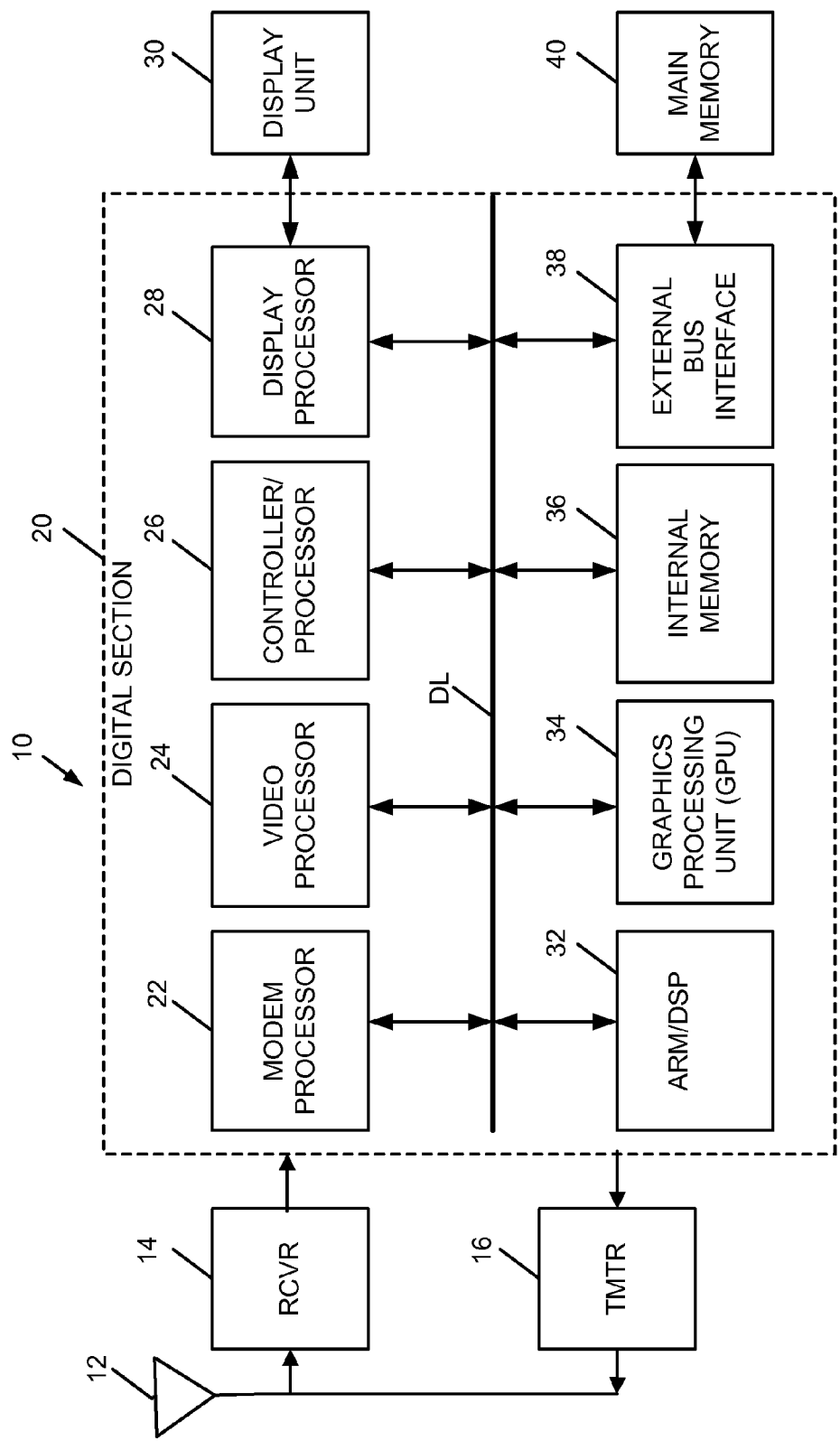
FIG. 1 shows a block diagram of a wireless device.

FIG. 1 shows a block diagram of an embodiment of a wireless device 10 in a wireless communication system. The wireless device 10 may be a cellular or camera phone, a terminal, a handset, a personal digital assistant (PDA), or some other device. The wireless communication system may be a Code Division Multiple Access (CDMA) system, a Global System for Mobile Communications (GSM) system, or some other system.

The wireless device 10 is capable of providing bi-directional communication via receive path and a transmit path. On the receive path, signals transmitted by base stations are received by an antenna 12 and provided to a receiver (RCVR) 14. The receiver 14 conditions and digitizes the received signals and provides samples to a digital section 20 for further processing. On the transmit path, a transmitter (TMTR) 16 receives data to be transmitted from the digital section 20, processes and conditions the data, and generates a modulated signal, which is transmitted via the antenna 12 to the base stations.

The digital section 20 includes various processing, interface and memory units such as, for example, a modem processor 22, a video processor 24, a controller/processor 26, a display processor 28, an ARM/DSP 32, a graphics processing unit (GPU) 34, an internal memory 36, and an external bus interface (EBI) 38. The modem processor 22 performs processing for data transmission and reception (e.g., encoding, modulation, demodulation, and decoding). The video processor 24 performs processing on video content (e.g., still images, moving videos, and moving texts) for video applications such as camcorder, video playback, and video conferencing. The controller/processor 26 may direct the operation of various processing and interface units within digital section 20. The display processor 28 performs processing to facilitate the display of videos, graphics, and texts on a display unit 30. The ARM/DSP 32 may perform various types of processing for the wireless device 10. The graphics processing unit 34 performs graphics processing.

The techniques described herein may be used for any of the processors in the digital section 20, e.g., the graphics processing unit 34. The internal memory 36 stores data and/or instructions for various units within the digital section 20. The EBI 38 facilitates the transfer of data between the digital section 20 (e.g., internal memory 36) and a main memory 40 along a bus or data line DL.

The digital section 20 may be implemented with one or more DSPs, micro-processors, RISCs, etc. The digital section 20 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

Figure 2:
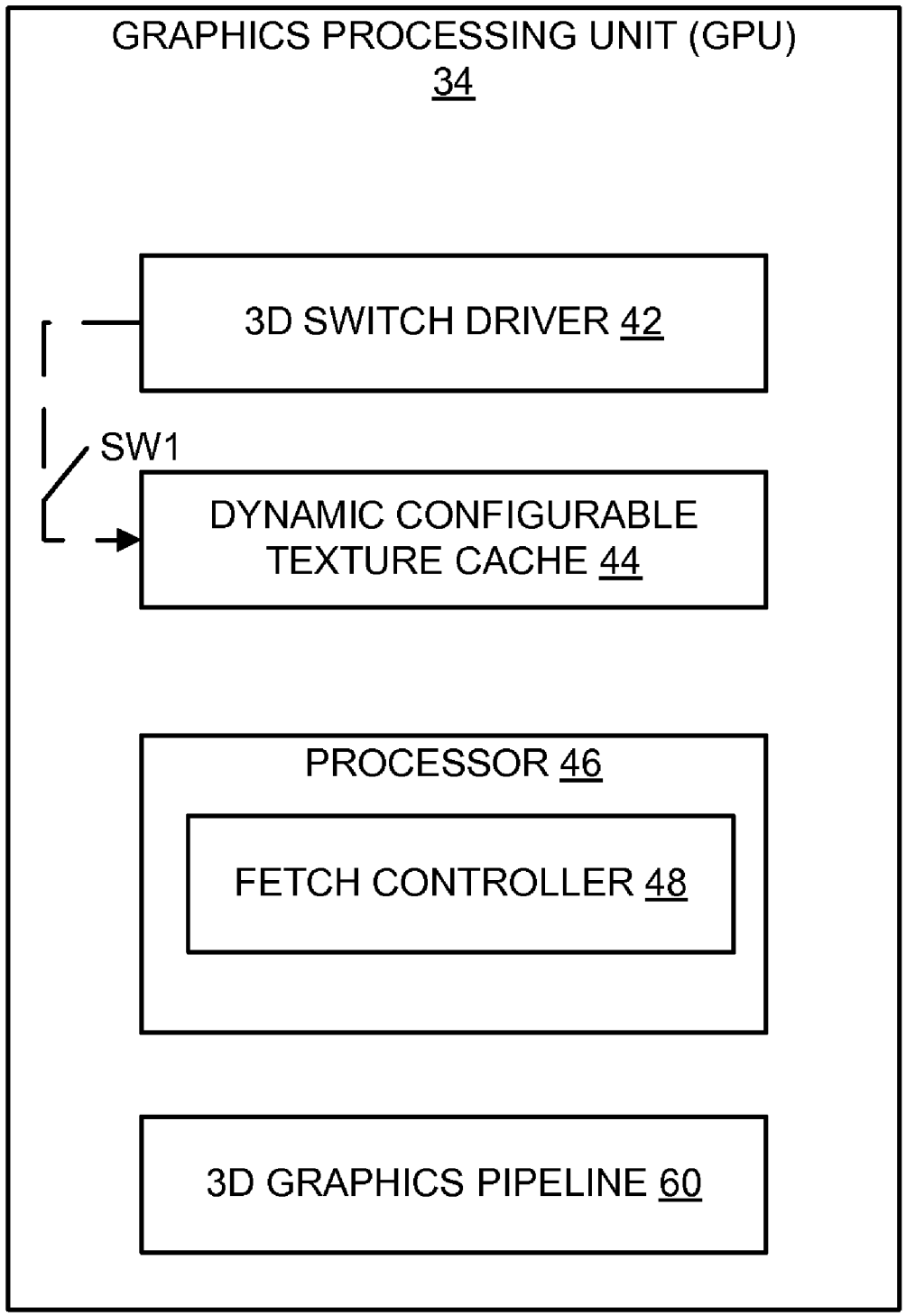
FIG. 2 shows a general block diagram of a graphics processing unit.

FIG. 2 shows a general block diagram of a GPU, generally designated at 34. The GPU 34 includes a three-dimensional (3D) switch driver 42 and a dynamic configurable texture cache 44. The 3D switch driver 42 provides a switching control signal SW1 for the cache 44 to reconfigure. The GPU 34 also includes a 3D graphics pipeline 60 which will be described in detail later. Additionally, the GPU 34 includes a processor 46 having a fetch controller 48. The fetch controller 48 serving to generate commands to fetch requested texture data from one or more of the texture maps TM.

Figure 8:
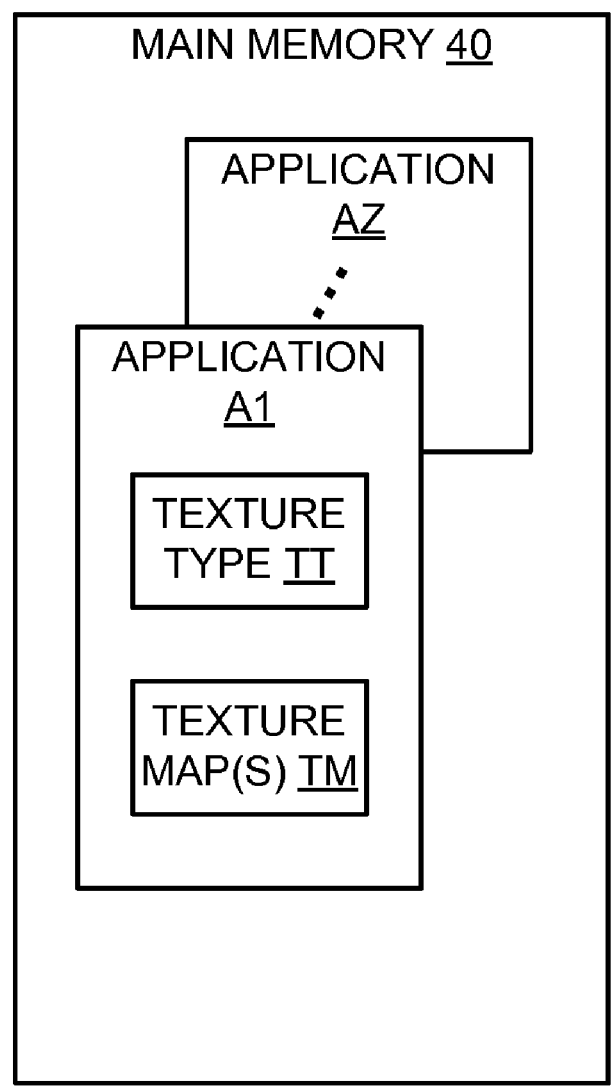
FIG. 8 shows a general block diagram of stored applications in the main memory.

FIG. 8 shows stored applications A1 . . . AZ in the main memory 40. The stored application A1 . . . AZ may include game applications or other graphics. applications. Each application has associated therewith a texture type TT and one or more texture maps TM. In operation, depending on the selected application, the 3D switch driver 42 parses the selected application and determines which texture (single or multiple texture) type TT is enabled for the selected application. Thereafter, the 3D switch driver 42 generates the switching control signal SW1 to cause the cache 44 to reconfigure for a single texture mode or a multi-texture mode. Texture mapping is a shading technique that maps, via at least one texture map TM, a 2D texture image onto the surface of a 3D object. The 2D texture image is stored in the main (external) memory 40. The individual elements of a texture image are called texels.

Figure 3A:
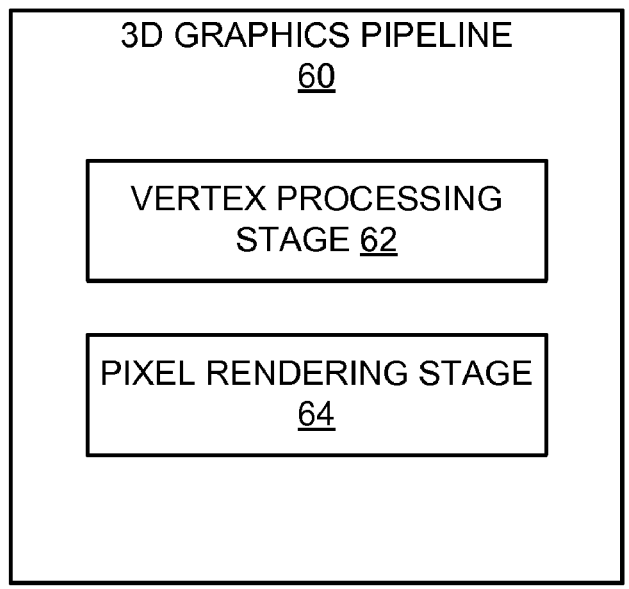
FIG. 3A shows a conventional three-dimensional (3D) pipeline.
Figure 3B:
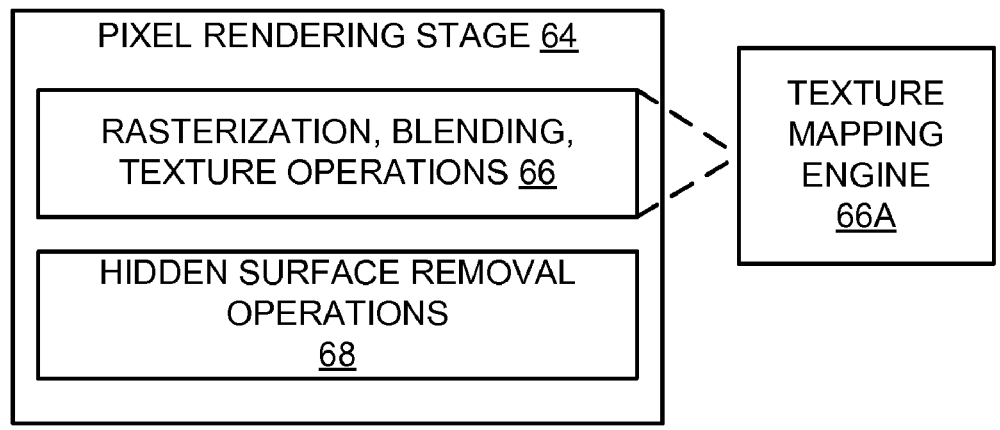
FIG. 3B shows a conventional pixel rendering stage.

Referring also to FIGS. 3A and 3B, there is shown an embodiment of a conventional 3D graphics pipeline and pixel rendering stage, generally designated at 60 and 64, respectively. The 3D graphics pipeline 60 divides the entire task of 3D representation on the display unit 30 into at least two (2) pipeline stages: a vertex processing stage 62, and a pixel rendering stage 64. In operation, the vertex processing stage 62 may include all the functions or a subset of the functions currently implemented in the OpenGL® or OpenGL®ES.

The pixel rendering stage 64 includes rasterization, blending, and texture application operations 66 and hidden surface removal operations 68. Nevertheless, the pixel rendering stage 64 may include other operations defined by OpenGL® or OpenGL® ES. The pixel rendering stage 64 converts the information about 3D objects from the vertex processing stage 62 into a bit map that can be displayed on the display unit 30. The pixel rendering stage 64 processes input triangle sets to produce a pixel representation of a 3D graphic image. During the rasterization, blending, and texture application operations 66, the texture mapping engine 66A performs texturing operations.

Figure 4:
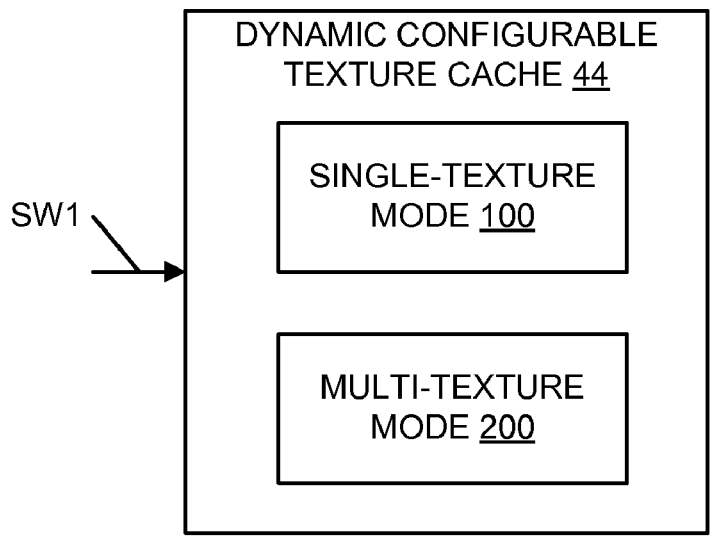
FIG. 4 shows a general block diagram of a dynamic configurable texture cache.
Figure 6A:
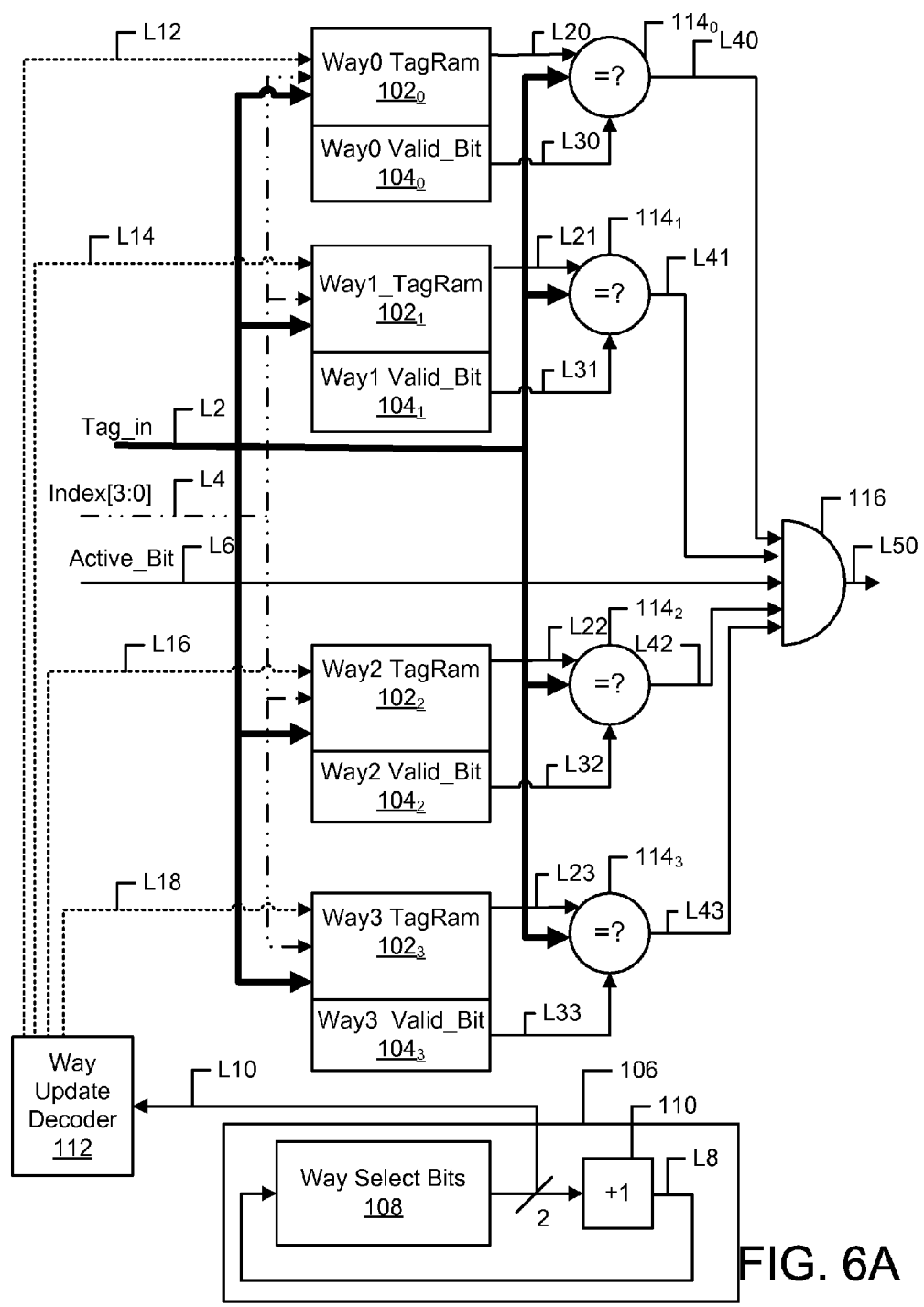
FIGS. 6A-6B show a schematic diagram of a dynamic configurable texture cache in a single-texture mode.
Figure 6B:
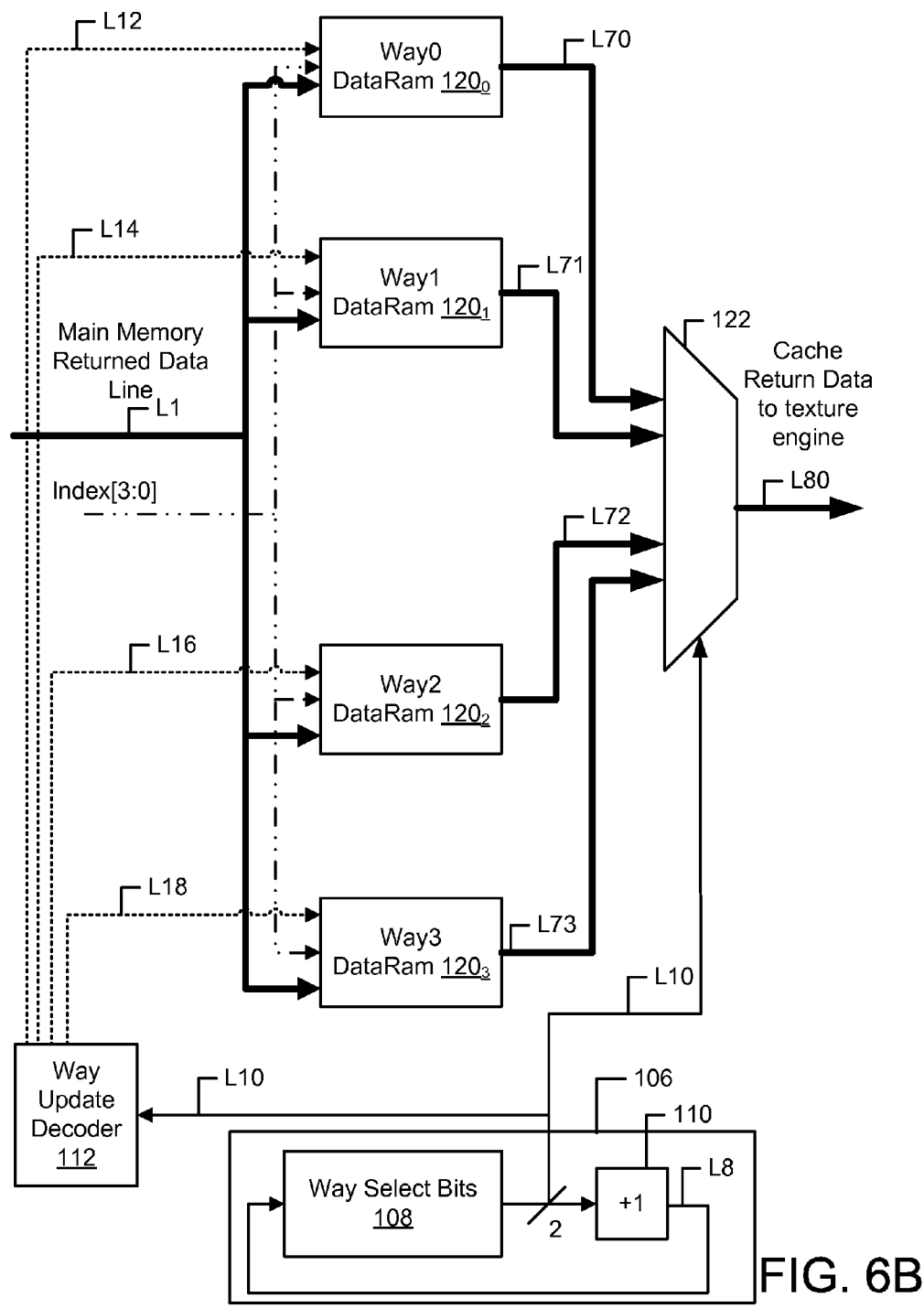

With reference to FIG. 4, a general block diagram of the dynamic configurable texture cache 44 is shown. The dynamic configurable texture cache 44 of the GPU 34 is dynamically configurable/reconfigurable to operate in one of a single-texture mode 100, which single texture mapping is enabled in the selected application, and a multi-texture mode 200, when multi-texture mapping is enabled in the selected application. The schematic diagram of the dynamic configurable texture cache 44 in the single-texture mode 100 is best seen in FIGS. 6A-6B. The dynamic configurable texture cache 44 in the single-texture mode 100 is an n-way set-associative cache. In the exemplary embodiment, n is an even number. In the illustrated embodiment, n is equal to 4. In the exemplary embodiment, the 4-way set-associated texture cache has a size approximately 4 KB to handle texture lookups, each cache line is 128 bits wide. The dynamic configurable texture cache 44, in the single-texture mode 100, is designed to support up to two textures per pass.

For illustrative purposes, two textures per pass means, for each pixel, that texels are simultaneously mapped from two different texture maps on top of it, without going through multiple passes. For example, if a cache only supports single texture mapping, to achieve multi-texture mapping effect, single texture mapping must be performed multiple times on each pixel. Accordingly, multiple textures per pass means, for each pixel, texels are simultaneously mapped from multiple (different) texture maps without going through multiple passes.

Figure 5A:
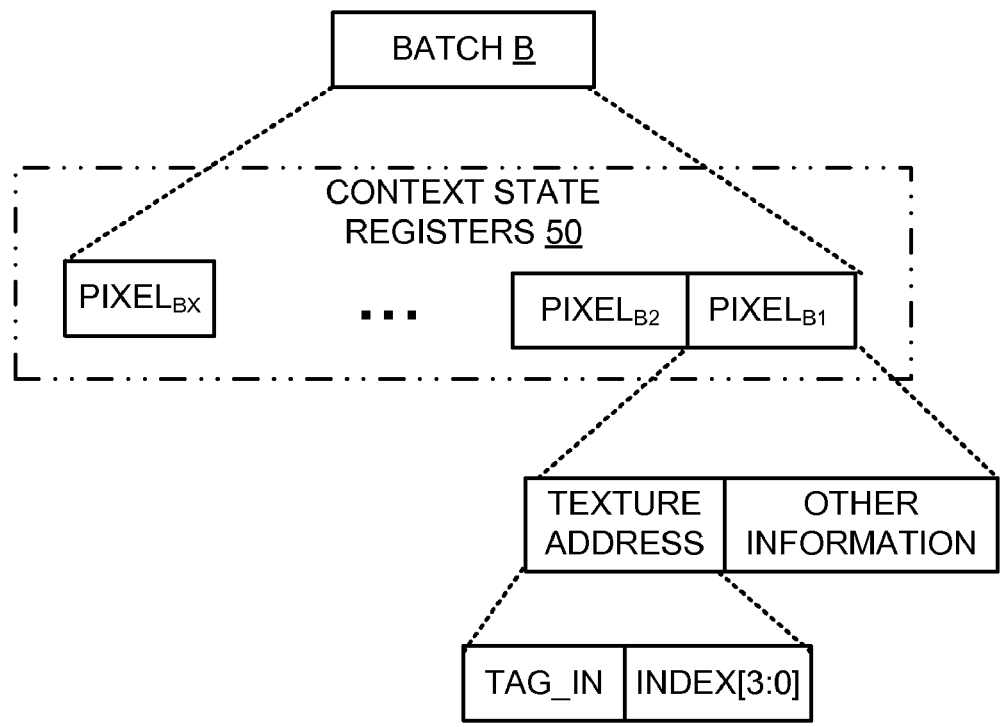
FIG. 5A shows a pixel batch in a single-texture mode.

Referring now to FIG. 5A, a block diagram of a batch, generally denoted B, for a single-texture mode is shown. A graphics application typically sends drawing commands in a batch mode wherein all of the pixels, denoted as $PIXEL_{B1}$, $PIXEL_{B2}$, . . . $PIXEL_{BX}$, in the batch B, share the same context state registers 50 (where X is equal to the number of pixels in the batch).

In a single-texture mode, as determined by the texture type TT, all pixels $PIXEL_{B1}$, $PIXEL_{B2}$, . . . $PIXEL_{BX}$ fetch texels from a single texture map TM. The texture map TM is one single texture map. In a two texture (multi-texture mode) batch, each of the pixels $PIXEL_{B1}$, $PIXEL_{B2}$, . . . $PIXEL_{BX}$ fetch texels from 2 different texture maps (where X is equal to the number of pixels in the batch).

In the exemplary embodiment, every pixel $PIXEL_{B1}$, $PIXEL_{B2}$, $PIXEL_{BX}$ generates a texture address and other information for the pixel. The texture address of the pixel has a corresponding tag and index, denoted as TAG_IN and INDEX[3:0], respectively. The component [3:0] corresponds to the addressing format. Here, "3:0" is the nomenclature representative of a four (0, 1, 2, 3) digit binary address. Thus, the index (of the exemplary embodiment) has $2^4$ distinct addresses. The index is used to access a tagram $102_0$, $102_1$, $102_2$, $102_3$ (FIG. 6A). The subscript of the tagram $102_0$, $102_1$, $102_2$, $102_3$ also corresponds to the way. Thus, a subscript of 0 corresponds to way0, subscript 1 corresponds to way1, subscript 2 corresponds to way2 and subscript 3 or (n−1) corresponds to way3 or way(n−1).

In FIGS. 6A-6B, a schematic diagram of the dynamic configurable texture cache 44 in the single-texture mode 100 is shown. The cache's set associative is a 4-way (n=4). Thus, there are four (4) entries or cache lines to be selected by one index INDEX[3:0]. As best seen in FIG. 6A, the cache 44 in the single-texture mode 100 includes n-cache blocks where each block includes a way tagram $102_0$, $102_1$, $102_2$, or $102_3$ and a way valid_bit indicator $104_0$, $104_1$, $104_2$, or $104_3$. As best seen in FIG. 6B, each block further includes a way dataram $120_0$, $120_1$, $120_2$, or $120_3$. Each block also represents a complete "cache line.

The dynamic configurable texture cache 44 is composed by n "cache lines." Each cache line is selected by the index. The cache 44 is a level of memory hierarchy between the 3D hardwired pipeline and the main (external) memory 40. When 3D graphics pipeline 60 sends an address to the main (external) memory 40 to read back texels, the 3D graphics pipeline 60 first checks if the data (texel) is inside the dynamic configurable texture cache 44. The address is divided into: the index denoted as INDEX[3:0], which is used to select the cache line; and a tag field, denoted as TAG_IN, which is used to compare with the value of the tag field of the cache. If there is a match, it means the content is inside the cache 44 and specifically, the cache line having the match.

In a typical cache, each cache line has a valid bit indicator. In the exemplary embodiment, the values of the valid bit include 1) Valid_bit="1" means there is valid content stored in this cache line; and 2) Valid_bit ="0" means the cache line is empty. The valid bits are implemented by registers, and are initialized to "0" by a reset signal.

A valid bit indicator is associated with each respective way tagrams $102_0$, $102_1$, $102_2$, and $102_3$. Thus, the way0 tagrams $102_0$ has associated therewith way0valid_bit indicator $104_0$. The way1 tagrams $102_1$ has associated therewith way1valid_bit indicator $104_1$. The way2 tagrams $102_2$ has associated therewith way2 valid_bit indicator $104_2$. The way3 tagrams $102_3$ has associated therewith way3 valid_bit indicator $104_3$. The valid_bit indicators indicate that a given entry into the cache 44 contains valid data. The way valid_bit indicators $104_0$, $104_1$, $104_2$, and $104_3$ produce outputs on lines L30, L31, L32 and L33, respectively.

Each way tagram $102_0$, $102_1$, $102_2$, and $102_3$ receives three (3) inputs. The first input, on line L2, is the TAG_IN, shown in bold, for a respective pixel in the batch B. The second input, on line L4, is the index, denoted as INDEX[3:0], shown as a line having a dash followed by two dots. The index is used to access a way tagram $102_0$, $102_1$, $102_2$, and $102_3$. The third input of each way tagram $102_0$, $102_1$, $102_2$, and $102_3$ is from the way update decoder 112 shown in dotted lines. The way update decoder 112 receives an input on line L10 from a way selector 106.

As will be seen from the description below, the index INDEX[3:0] on line L4 selects one of the way tagram $102_0$, $102_1$, $102_2$, and $102_3$ of the cache lines, which then outputs a stored tag value on the corresponding output line, L20, L21, L22, and L23.

The way selector 106 includes a way select bits 108. The output of the way select bits 108 is fed to line L10 for processing by the way update decoder 112. The output of the way select bits 108 is also fed to an accumulator 110 which adds one (1) to the output of the way select bits 108. The number 2 (in the box labeled 106) represents a two-bit signal. The output on line L8 is looped back to the way select bits 108. The way update decoder 112 outputs control bits on lines L12, L14, L16 and L18, shown as dotted lines, to select one of the n-way associative sets. The way update decoder 112 receives the two-bit signal on line L10 and generates a one-bit signal to select any of the n blocks or the way tagram $102_0$, $102_1$, $102_2$, and $102_3$ and/or way dataram $120_0$, $120_1$, $120_2$, and $120_3$ of the cache lines shown in FIG. 6B.

When a miss occurs in the cache 44, the requested data should go in one cache line, and the data occupying that cache line must be replaced. In an n-way associative cache, a choice of (n) datarams $120_0$, $120_1$, $120_2$, and $120_3$ are used to place the requested data. The way selector 106 is to pick up which cache line out of n-ways is to be replaced.

The outputs of the way valid_bit indicators $104_0$, $104_1$, $104_2$, and $104_3$ produce outputs on lines L30, L31, L32 and L33, respectively, which are sent to comparators $114_0$, $114_1$, $114_2$, and $114_3$, respectively. Additionally, the outputs on lines L20, L21, L22 and L23 from the way tagrams $102_0$, $102_1$, $102_2$, and $102_3$ are sent to comparators $114_0$, $114_1$, $114_2$, and $114_3$, respectively. The comparators $114_0$, $114_1$, $114_2$, and $114_3$ also receive the TAG_IN as input from line L2.

The comparisons by the comparators $114_0$, $114_1$, $114_2$, and $114_3$ are performed between the 4 (n=4) possible tag contents on lines L20, L21, L22 and L23, respectively, out of the tagrams $102_0$, $102_1$, $102_2$, and $102_3$ and the incoming pixel's tag TAG_IN. If one of the four comparisons from the comparators $114_0$, $114_1$, $114_2$, and $114_3$ results in a match, such a match implies a cache hit. Thus, the output on line L50 from an Operand 116 represents a cache hit. By way of example, the Operand 116 is represented as an AND gate. Otherwise, if there are no matches, the output on line L50 from Operand 116 represents a cache miss. The comparators $114_0$, $114_1$, $114_2$, and $114_3$ output a result of their respective comparison on lines L40, L41, L42 and L43 which are fed to inputs of Operand gate 116. The Operand gate 116 also receives an input on line L6 representative of an active_bit. If the output on line L50 from the Operand 116 is representative of a miss, the output is a fetch request sent to the fetch controller 48. The fetch controller 48 then communicates via the bus or data line DL to retrieve the necessary texture map data from the main (external) memory 40.

However, if the Valid_bit on any one of the lines L30, L31, L32, L33 is "0," the comparison associated with that Valid_bit is not used.

With specific reference to FIG. 6B, when there is a cache hit by any of the cache lines or blocks, the requested texture data is read out of the corresponding way dataram $120_0$, $120_1$, $120_2$, or $120_3$ on one of lines L70, L71, L72 or L73, respectively. The output texture data on lines L70, L71, L72 or L73 is sent to a multiplexer 122. The output from the multiplexer 122 is sent on line L80 to the texture mapping engine 66A.

The output on line L10 from the way selector 106 is used to control the multiplexer 122. Each way dataram $120_0$, $120_1$, $120_2$, or $120_3$ is populated with corresponding texture map data from the main (external) memory 40 on line L1.

The Active_bit on line L6 is specifically used in the 3D graphics pipeline 60. Sometime, a pixel does not require a texture lookup. In this specific case the active bit on line L6 is also set to "0." Therefore, the cache 44 would not operate on this pixel.

When the texture mapping engine 66A is in a multi-texture mode, the pixels, denoted as $PIXEL_{B1}$, $PIXEL_{B2}$, ... $PIXEL_{BX}$, in the batch B, fetch texels from multiple different texture maps TM.

Figure 5B:
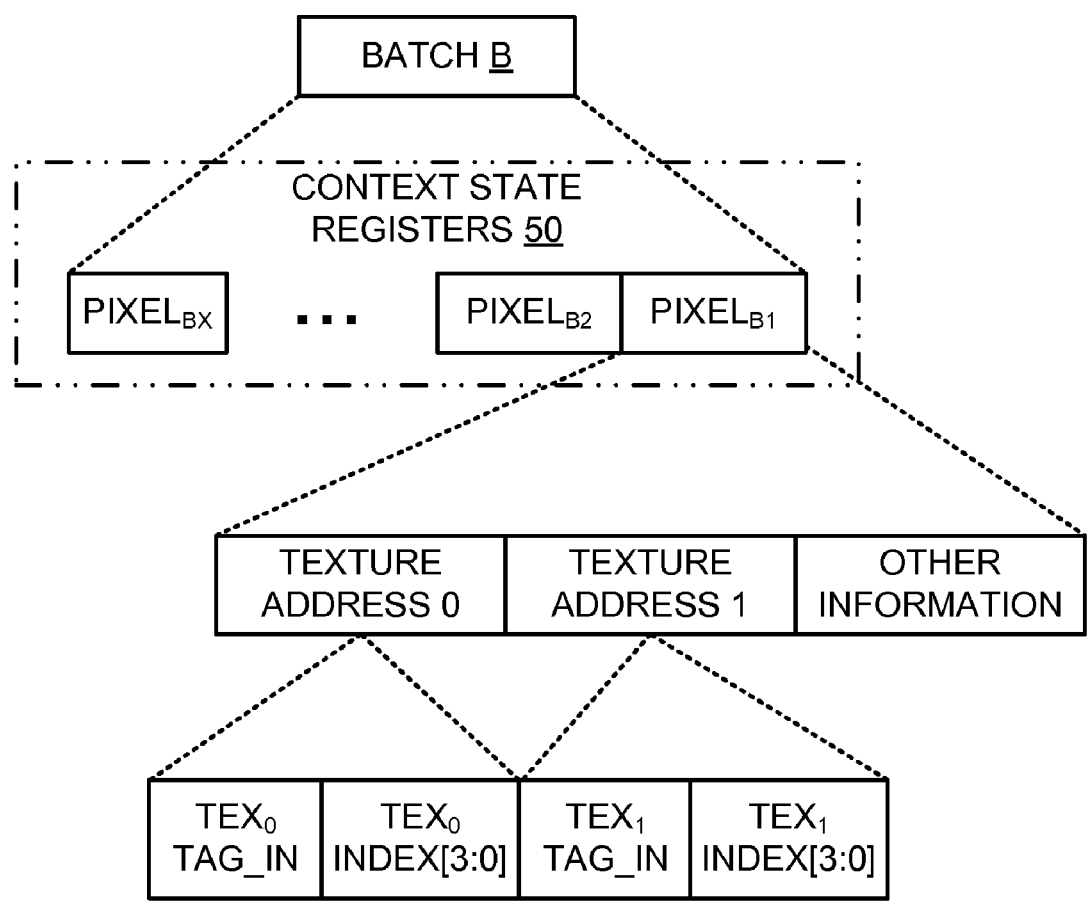
FIG. 5B shows a pixel batch in a multi-texture mode.

Referring now to FIG. 5B, a block diagram of the batch in the multi-texture mode is shown. In the exemplary embodiment, the multi-texture mode, relates to two texture maps. Nevertheless, two or more texture maps may be used. For a two texture batch, each of the pixels $PIXEL_{B1}$, $PIXEL_{B2}$, ... $PIXEL_{BX}$ fetch texels from two (2) different texture maps (where X is equal to the number of pixels in the batch). Every pixel $PIXEL_{B1}$, $PIXEL_{B2}$, ... $PIXEL_{BX}$ generates a first texture address field 0, a second texture address field 1 and a field for other pixel information. The first texture address field 0 has a tag and index, denoted as Tex0 TAG_IN and Tex 0 INDEX[3:0] for sub-cache C0. The second texture address field 1 has a tag and index denoted as Tex1 TAG_IN and Tex 1 INDEX[3:0] for sub-cache C1. The index Tex 0 INDEX[3:0] is used to access the Tex0 way tagram $202_{00}$, $202_{01}$ (FIG. 7A) of sub-cache C0. The index Tex 1 INDEX[3:0] is used to access the Tex1 way tagram $202_{10}$, $202_{11}$, (FIG. 7A) of sub-cache C1.

Figure 7A:
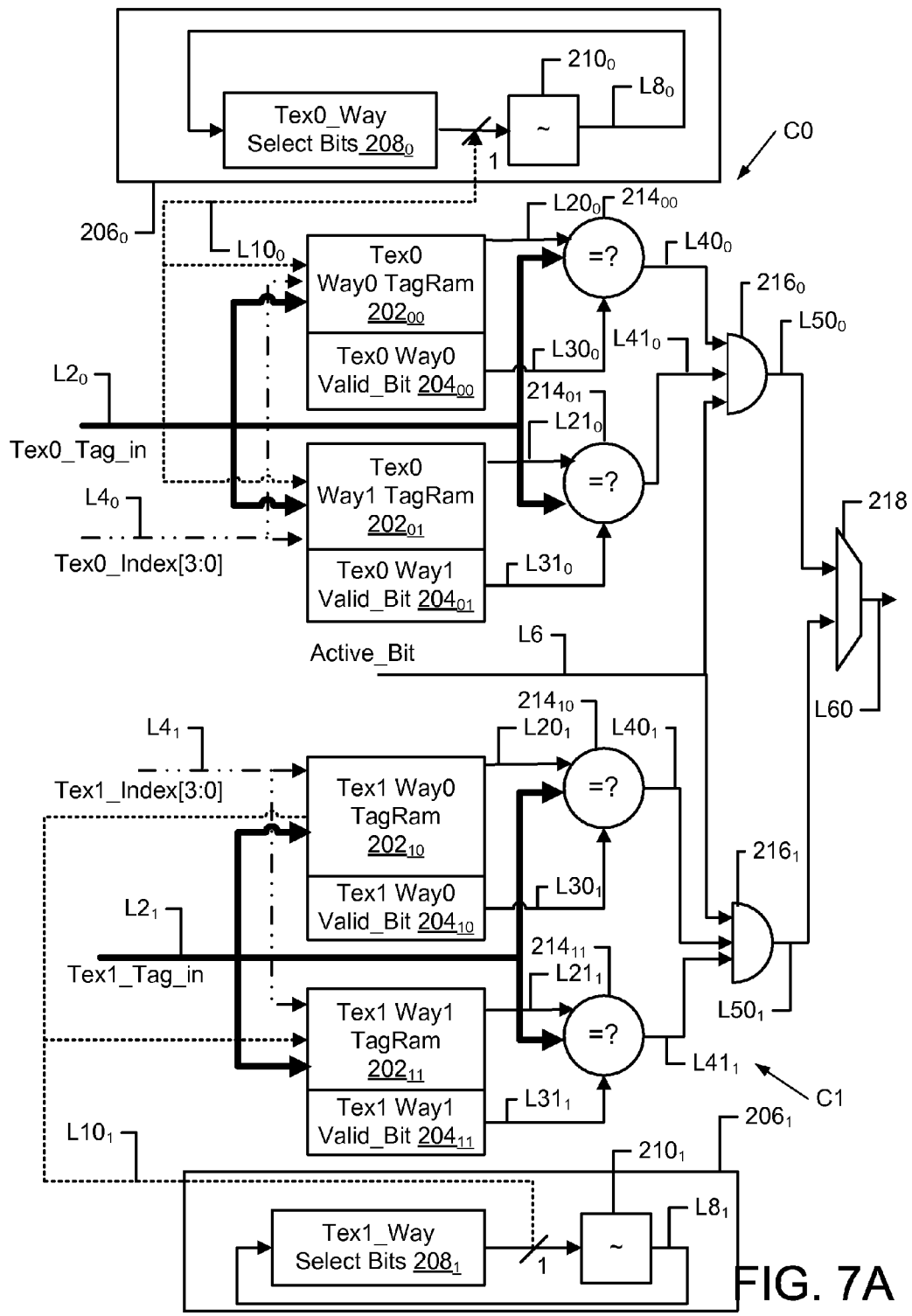
FIGS. 7A-7B show a schematic diagram of a dynamic configurable texture cache in a multi-texture mode.
Figure 7B:
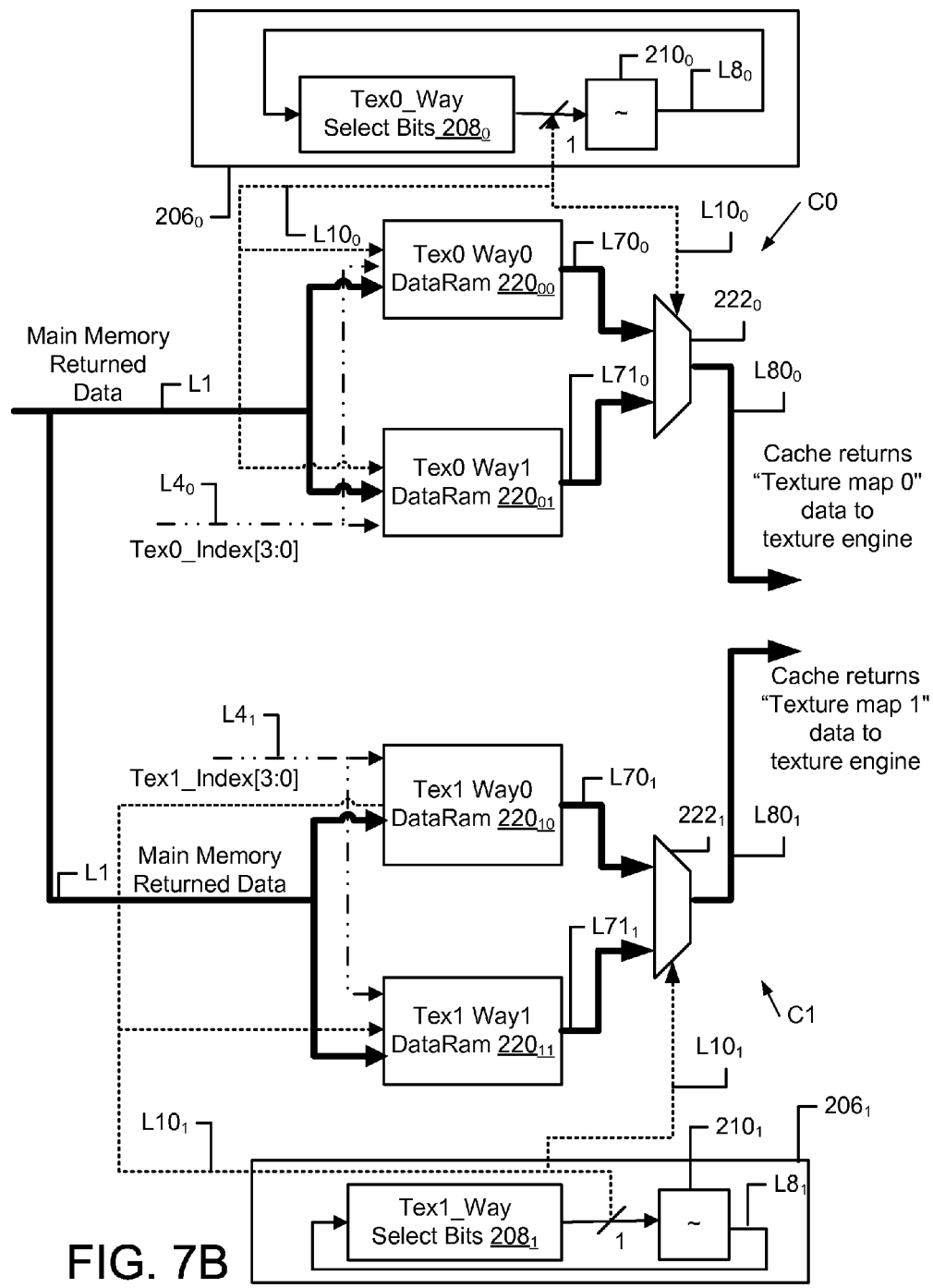

In FIGS. 7A-7B, a schematic diagram of the dynamic configurable texture cache 44 in the multi-texture mode 200 is shown. The cache's set associative is 4-way (n=4) of FIG. 6A-6B has been split or divided to create two 2-way set-associative sub-caches C0 and C1. Thus, there are two entries to be selected out by one index Tex 0 INDEX[3:0] in sub-cache C0. Likewise, there are two entries to be selected out by one index Tex 1 INDEX[3:0] in sub-cache C1. The sub-cache C0 includes two ways, "way0" and "way1". The sub-cache C0 has at least two cache blocks, way0 and way1. The way0 block includes a Tex0 way0 tagram $202_{00}$ and the way1 block includes a Tex0 way1 tagram $202_{01}$. Each block way0 and way1 further includes a way0 valid_bit indicator $204_{00}$ and a way1 valid_bit indicator $204_{01}$ (where the first digit of the subscript represents the texture map and the second digit represents the way). The sub-cache C1 includes 2-ways ("way0" and "way1"). The sub-cache C1 has two blocks a way0 block and a way1 block. The way0 block includes a Tex1 way0 tagram $202_{10}$ and the way1 block has a Tex1 way1 tagram $202_{11}$. The way0 block of sub-cache C1 further includes a way0 valid_bit indicator $204_{10}$ and the way1 block has a way1 valid_bit indicator $204_{11}$.

The valid_bit indicators indicate that a given entry into the sub-cache C0 or C1 contains valid data. The way0 valid_bit indicators $204_{00}$, $204_{01}$ produce outputs on lines $L30_0$, $L31_0$, respectively. The way1 valid_bit indicators $204_{10}$, $204_{11}$, produce outputs on lines $L30_1$, $L31_1$, respectively.

Each of the tagrams $202_{00}$, $202_{01}$ of sub-cache C0 receives three (3) inputs. The first input is the TEX0 TAG_IN on line $L2_0$, shown in bold, for a respective pixel in the batch B. The second input on line $L4_0$ is the index TEX0 INDEX[3:0], shown as a line having a dash followed by two dots. The index is used to access a tagram $202_{00}$, $202_{01}$. The third input to each way tagram $202_{00}$, $202_{01}$ is from the way selector $206_0$ on line $L10_0$.

The outputs of the valid_bit indicators $204_{00}$, $204_{01}$ produce outputs on lines $L30_0$, $L31_0$, respectively, which are sent to comparators $214_{00}$, $214_{01}$, respectively. Additionally, the outputs on lines $L20_0$, $L21_0$ from the tagrams $202_{00}$, $202_{01}$ of sub-cache C0 are sent to comparators $214_{00}$, $214_{01}$, respectively. The comparators $214_{00}$, $214_{01}$ also receive the TEX0 TAG_IN.

However, if the Valid_bit on any one of the lines $L30_0$, $L31_0$, $L30_1$, or $L31_1$, is "0," the comparison associated with that Valid_bit is not used. Furthermore, the Active_bit on line L6 is specifically used in the 3D graphics pipeline 60 and functions in a similar manner as described above.

The comparisons by the comparators $214_{00}$, $214_{01}$ are performed between the two possible tag contents on lines $L20_0$, $L21_0$, respectively, out of the 2-way tagrams $202_{00}$, $202_{01}$ of sub-cache C0 and the incoming pixel's tag TEX0 TAG_IN. If one of the two comparisons from the comparators $214_{00}$, $214_{01}$ results in a match, such a match implies a sub-cache hit. Thus, the output on line $L50_0$ from an Operand $216_0$ represents a sub-cache hit. By way of example, the Operand $216_0$ is represented as an AND gate. Otherwise, the output on line $L50_0$ from Operand gate $216_0$ represents a cache miss. The comparators $214_{00}$, $214_{01}$ output a result of their respective comparisons on lines $L40_0$, $L41_0$, which are fed to inputs of Operand gate $216_0$. The Operand gate $216_0$ also receives an input on line L6 representative of an active_bit.

Each tagram $202_{10}$, $202_{11}$, of sub-cache C1 receives three (3) inputs. The first input is the TEX1 TAG_IN on line $L2_1$, shown in bold, for a respective pixel in the batch B. The second input on line $L4_1$ is the index TEX1 INDEX[3:0], shown as a line having a dash followed by two dots. The index is used to access a tagram $202_{10}$, $202_{11}$. The third input of each tagram $202_{10}$, $202_{11}$, is from the way selector $206_1$ on line $L10_1$.

The outputs of the way valid_bit indicator $204_{10}$, $204_{11}$ produce outputs on lines $L30_1$, $L31_1$ respectively, which are sent to comparators $214_{10}$, $214_{11}$, respectively. Additionally, the outputs on lines $L20_1$, $L21_1$ from the tagrams $202_{10}$, $202_{11}$, of sub-cache C1 are sent to comparators $214_{10}$, $214_{11}$, respectively. The comparators $214_{10}$, $214_{11}$ also receive the TEX1 TAG_IN.

The comparisons by the comparators $214_{10}$, $214_{11}$ are performed between the 2 possible tag contents on lines $L20_1$, $L21_1$, respectively, out of the 2-way tagrams $202_{10}$, $202_{11}$ of sub-cache C1 and the incoming pixel's tag TEX1 TAG_IN. If one of the two comparisons from the comparators $214_{10}$, $214_{11}$ results in a match, such a match implies a sub-cache hit. Thus, the output on line $L50_1$ from an AND gate $216_1$ represents a sub-cache hit. Otherwise, the output on line $L50_1$ from Operand gate $216_1$ represents a sub-cache miss. The comparators $214_{10}$, $214_{11}$ output a result of their respective comparisons on lines $L40_1$, $L41_1$, which are fed to inputs of Operand gate $216_1$. The Operand gate $216_1$ also receives an input on line L6 representative of an active_bit.

In a final stage, the outputs of the sub-cache C0 and sub-cache C1 are inputs to a multiplexer 218. The multiplexer 218 multiplexes the outputs on line $L50_0$ and $L50_1$ to form a new multiplexed output on line L60. The output on line L60 is representative of a fetch request sent to the fetch controller 48. The multiplexed output sends one fetch request at a time.

With specific reference to FIG. 7B, when there is a cache hit by any of the cache lines or blocks of the sub-cache C0 or C1, the requested texture data is read out of the corresponding way dataram $220_{00}$, $220_{01}$ or $220_{10}$, $220_{11}$ on one of lines $L70_0$, $L71_0$ or $L70_1$, $L71_1$, respectively. The output texture data on lines $L70_0$, $L71_0$ in sub-cache C0 is sent to a multiplexer $222_0$. The output texture data on lines $L70_1$, $L71_1$ in sub-cache C1 is sent to a multiplexer $222_1$. The outputs from the multiplexers $222_0$ and $222_1$ on lines $L80_0$ and $L80_1$, respectively, are sent to as the multiple texture maps to the texture mapping engine 66A.

The output on line $L10_0$ from the way selector $206_0$ is used to control the multiplexer $222_0$. Likewise, the output on line $L10_1$ from the way selector $206_1$ is used to control the multiplexer $222_1$. Each way dataram $220_0$, $220_1$, $220_3$ is populated with corresponding texture map data from the main (external) memory 40 on line L1. The inverters denoted as $210_0$, $210_1$ invert the bit sent on the feed back lines $L8_0$ and $L8_1$. The feed back lines $L8_0$ and $L8_1$ are coupled to loop back the inverted bit to the Tex0 way select bit $208_0$ and the Tex1 way select bit $208_1$, respectively, of the way selectors $206_0$, $206_1$.

In the above embodiments, the dynamic configurable texture cache 44 is easily configurable to optimize the texture mapping engine 66A in one of a single texture mode 100 and a multi-texture mode 200 using one cache. Furthermore, the conflict misses do not generally occur. Moreover, the two (M=2) or more texture maps TM will not thresh each other and/or generate redundant memory traffics.

It is prohibitive to describe each and every possible configuration of the dynamic configurable texture cache 44 (e.g. a reconfigurable n-way set-associative texture cache). However, the cache 44 when in the multi-texture mode 200 should be configured to have n/M set-associative texture sub-cache dedicated to each texture map. The n and M are integers greater than one (1) and n is divisible by M. The value of M may be the number of texture maps. In the example, M is two (2) providing two (2) sub-caches, each sub-cache being dedicated to a respective one of the two texture maps.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A graphics processing unit comprising:
    a driver operable to determine whether single texture mapping is enabled or multi-texture mapping is enabled for a selected application; and
    a dynamically configurable cache having a first configuration corresponding to a n-way set-associative texture cache having n cache lines and corresponding to a single texture map, when the single texture mapping is enabled, and a second configuration corresponding to a set of n/M-way set-associative sub-caches, when the multi-texture mapping is enabled, where n and M are integers greater than 1, and n is divisible by M, each sub-cache corresponding to one of a plurality of texture maps and having more than one cache line.

2. The graphics processing unit of claim 1, wherein n is 4 and M is 2.

3. The graphics processing unit of claim 1, wherein the n-way set-associative texture cache includes: n-cache blocks operative to store texture data; an operand for generating a fetch command when all n-tag outputs of the n-cache blocks represent a miss for requested texture data; and a multiplexer operative to output the requested texture data from the n-cache blocks.

4. The graphics processing unit of claim 1, wherein each sub-cache of the set of n/M-way set-associative sub-caches includes: a plurality of sub-cache blocks operative to store texture data for a corresponding one texture map, and an operand for generating a fetch command output when all outputs of the plurality of sub-cache blocks represent a miss for requested texture data; and the set of n/M-way set-associative sub-caches includes a multiplexer to multiplex the fetch command output of said each sub-cache.

5. The graphics processing unit of claim 4, wherein each sub-cache of the set of n/M-way set-associative sub-caches further includes: a multiplexer operative to output the requested data from the plurality of sub-cache blocks.

6. An integrated circuit comprising:
    a driver operable to determine whether single texture mapping is enabled or multi-texture mapping is enabled for a selected application; and
    a dynamically configurable cache having a first configuration corresponding to a n-way set-associative texture cache having n cache lines and corresponding to a single texture map, when the single texture mapping is enabled, and a second configuration corresponding to a set of n/M-way set-associative sub-caches, when the multi-texture mapping is enabled, where n and M are integers greater than 1 and n is divisible by M, each sub-cache corresponding to one of a plurality of texture maps and having more than one cache line.

7. The integrated circuit of claim 6, wherein n is 4 and M is 2.

8. The integrated circuit of claim 6, wherein the n-way set-associative texture cache includes: n-cache blocks operative to store texture data; an operand for generating a fetch command when all n-tag outputs of the n-cache blocks represent a miss for requested texture data; and a multiplexer operative to output the requested texture data from the n-cache blocks.

9. The integrated circuit of claim 6, wherein each sub-cache of the set of n/M-way set-associative sub-caches includes: a plurality of sub-cache blocks operative to store texture data for a corresponding one texture map, and an operand for generating a fetch command output when all outputs of the plurality of sub-cache blocks represent a miss for requested texture data; and the set of n/M-way set-associative sub-caches includes a multiplexer to multiplex the fetch command output of said each sub-cache.

10. The integrated circuit of claim 9, wherein each sub-cache of the set of n/M-way set-associative sub-caches further includes: a multiplexer operative to output the requested data from the plurality of sub-cache blocks.

11. An apparatus comprising:
    a graphics processing unit having a dynamically configurable cache which has a first configuration corresponding to a n-way set-associative texture cache having n cache lines and corresponding to a single texture map, when a single texture mapping mode is enabled, and a second configuration corresponding to a set of n/M-way set-associative sub-caches, when a multi-texture mapping mode is enabled, where n and M are integers greater than 1 and n is divisible by M, each sub-cache corresponding to one of a plurality of texture maps and having more than one cache line.

12. The apparatus of claim 11, wherein n is 4 and M is 2.

13. The apparatus of claim 11, wherein the n-way set-associative texture cache includes: n-cache blocks operative to store texture data; an operand for generating a fetch command when all n-tag outputs of the n-cache blocks represent a miss for requested texture data; and a multiplexer operative to output the requested texture data from the n-cache blocks.

14. The apparatus of claim 11, wherein each sub-cache of the set of n/M-way set-associative sub-caches includes: a plurality of sub-cache blocks operative to store texture data for a corresponding one texture map, and an operand for generating a fetch command output when all outputs of the plurality of sub-cache blocks represent a miss for requested texture data; and the set of n/M-way set-associative sub-caches includes a multiplexer to multiplex the fetch command output of said each sub-cache.

15. The apparatus of claim 14, wherein each sub-cache of the set of n/M-way set-associative sub-caches further includes: a multiplexer operative to output the requested data from the plurality of sub-cache blocks.

16. The apparatus of claim 11, further comprising a memory coupled to the graphics processing unit.

17. A wireless device comprising:
a graphics processing unit having a dynamically configurable cache which has a first configuration corresponding to a n-way set-associative texture cache having n cache lines and corresponding to a single texture map, when a single texture mapping mode is enabled, and a second configuration corresponding to a set of n/M-way set-associative sub-caches, when a multi-texture mapping mode is enabled, where n and M are integers greater than 1 and n is divisible by M, each sub-cache corresponding to one of plurality of texture maps and having more than one cache line; and
a memory coupled to the graphics processing unit.

18. The device of claim 17, wherein n is 4 and M is 2.

19. The device of claim 17, wherein the n-way set-associative texture cache includes: n-cache blocks operative to store texture data; an operand for generating a fetch command when all n-tag outputs of the n-cache blocks represent a miss for requested texture data; and a multiplexer operative to output the requested texture data from the n-cache blocks.

20. The device of claim 17, wherein each sub-cache of the set of n/M-way set-associative sub-caches includes: a plurality of sub-cache blocks operative to store texture data for a corresponding one texture map, and an operand for generating a fetch command output when all outputs of the plurality of sub-cache blocks represent a miss for requested texture data; and the set of n/M-way set-associative sub-caches includes a multiplexer to multiplex the fetch command output of said each sub-cache.

21. The device of claim 20, wherein said each sub-cache of the set of n/M-way set-associative sub-caches further includes: a multiplexer operative to output the requested data from the plurality of sub-cache blocks.

22. A non-transitory computer readable medium having instructions for causing a computer to:
determine whether a selected application has single texture mapping enabled or multi-texture mapping enabled;
configure a n-way set-associative texture cache having n cache lines and corresponding to a single texture map when the single texture mapping is enabled; and
divide the n-way set-associative texture cache into a set of M n/M-way set-associative sub-caches when the multi-texture mapping is enabled, where n and M are integers greater than 1, n is divisible by M, and M corresponds to a number of texture maps, each sub-cache corresponding to one of a plurality of texture maps and having more than one cache line.

23. A method comprising:
determining whether a selected application has single texture mapping enabled or multi-texture mapping enabled;
configuring a n-way set-associative texture cache having n cache lines and corresponding to a single texture map when the single texture mapping is enabled; and
dividing the n-way set-associative texture cache into a set of M n/M-way set-associative sub-caches when the multi-texture mapping is enabled, where n and M are integers greater than 1, n is divisible by M, and M corresponds to a number of texture maps, each sub-cache corresponding to one texture map of a plurality of texture maps and having more than one cache line.

24. An apparatus comprising:
means for determining whether a selected application has single texture mapping enabled or multi-texture mapping enabled;
means for configuring a n-way set-associative texture cache having n cache lines and corresponding to a single texture map when the single texture mapping is enabled; and
means for dividing the n-way set-associative texture cache into a set of M n/M-way set-associative sub-caches when the multi-texture mapping is enabled, where n and M are integers greater than 1, n is divisible by M, and M corresponds to a number of texture maps, each sub-cache corresponding to one texture map of a plurality of texture maps and having more than one cache line.

* * * * *